US006205954B1

United States Patent
Bogaerts

(10) Patent No.: US 6,205,954 B1
(45) Date of Patent: Mar. 27, 2001

(54) DEVICE FOR COLLECTING EXCREMENTS OF PET ANIMALS AND AUXILIARY ELEMENT APPLIED THEREWITH

(76) Inventor: Lieven Bogaerts, Kaaistraat 27, B-3580 Beringen (BE)

(*) Notice: Subject to any disclaimer, the term of this patent is extended or adjusted under 35 U.S.C. 154(b) by 0 days.

(21) Appl. No.: 09/434,935

(22) Filed: Nov. 5, 1999

(30) Foreign Application Priority Data

Nov. 6, 1998 (BE) .................................................. 9800810

(51) Int. Cl.[7] .................................................. A01K 29/00

(52) U.S. Cl. .................................................. 119/166

(58) Field of Search ................................ 119/161, 163, 119/164, 165, 166, 168

(56) References Cited

U.S. PATENT DOCUMENTS

| 4,934,317 | * | 6/1990 | Pourshalchi | 119/166 |
| 5,477,812 | * | 12/1995 | Waters | 119/166 |
| 5,544,620 | * | 8/1996 | Sarkissian | 119/166 |
| 5,931,119 | * | 8/1999 | Nissim et al. | 119/166 |

* cited by examiner

Primary Examiner—Thomas Price
(74) Attorney, Agent, or Firm—Bacon & Thomas PLLC

(57) ABSTRACT

A device for collecting excrements of pet animals, more particularly a so-called litter box for cats, of the type which at least consists of a receptacle (2) in which a filling material (3) can be provided, a carrying element (4) which can be moved through the receptacle (2) in order to remove waste substances (5–6) from the filling material, and wherein the device (1) is equipped with a removal unit (29) which cooperates with the carrying element (4) and removes waste substances (6) from the carrying element (4).

17 Claims, 6 Drawing Sheets

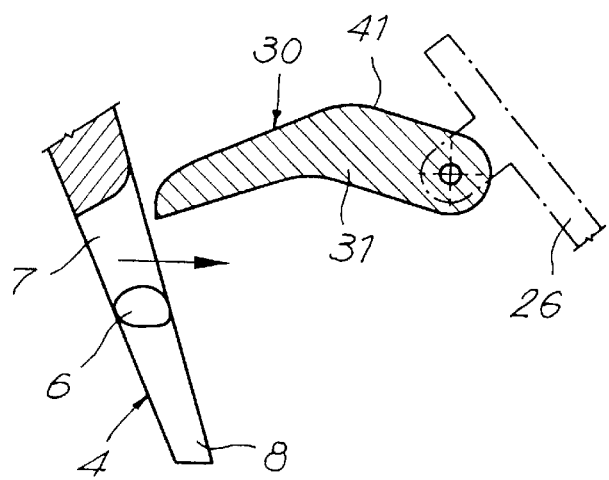
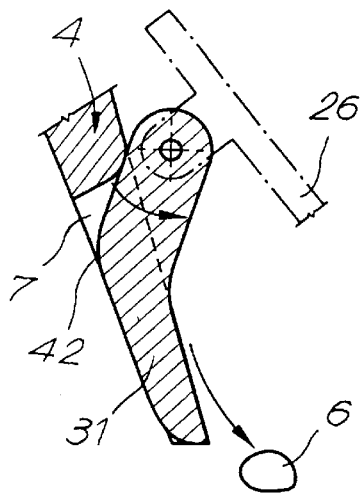
Fig.6  Fig.7
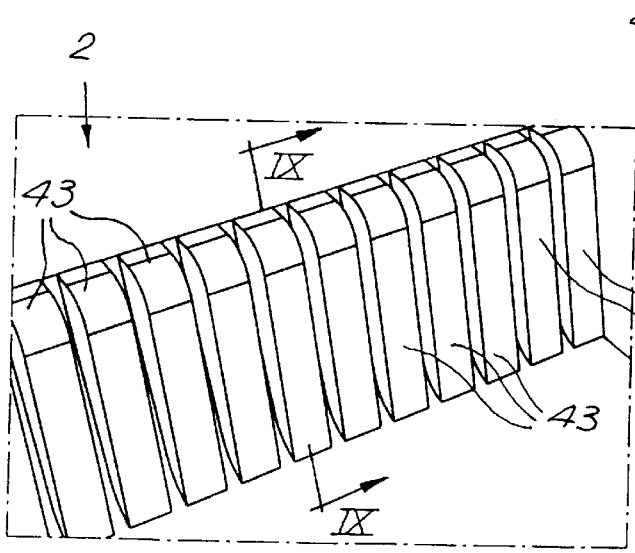
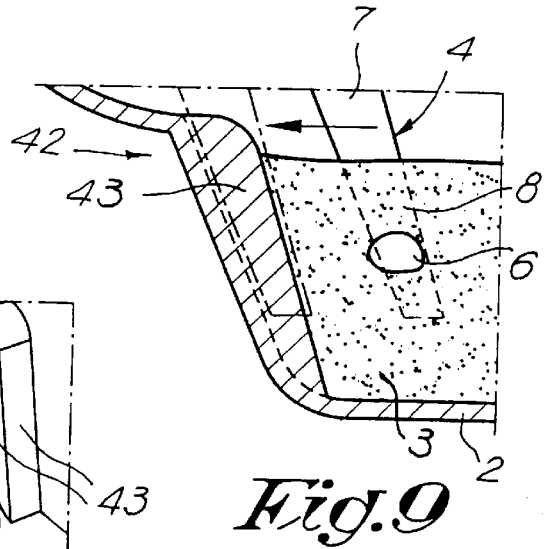
Fig.8  Fig.9

DEVICE FOR COLLECTING EXCREMENTS OF PET ANIMALS AND AUXILIARY ELEMENT APPLIED THEREWITH

BACKGROUND OF THE INVENTION

1. Field of the Invention

This invention relates to a device for collecting excrements of pet animals, more particularly a so-called litter box for cats, as well as to an auxiliary element which can be applied therewith.

2. Related Art

It is known that such devices substantially consist of a receptacle in which a filling material can be provided. It is also known that hereby a filling material, such as grains of an absorbing material, for example, based on bentonite, can be applied which, when coming into contact with a liquid, such as the urine of the animal, clumps to a larger substance.

In such a receptacle, waste substances are found, on one hand, in the form of solid or semi-solid excrements and, on the other hand, in the form of substances which, as aforementioned, have been formed as a consequence of the fact that a certain quantity of the filling material has come into contact with the liquid excrements, more particularly, the urine, of the animal.

It is known that such devices can be equipped with a carrying element which can be moved through the receptacle in order to automatically remove the aforementioned waste substances from the filling material. An example of such a device is commercialized, amongst others, by the Windmere company, and is traded under the trade name of LitterMaid. Hereby, the carrying element consists of a comb which is moved through the filling material like a rake. This comb has teeth which are situated at mutual distances which are larger than the diameter of the grains, in such a manner that the comb can move freely through the grains, whereas larger waste substances are carried off with the comb to an extremity of the receptacle, where a receiving container is situated.

The present invention aims at an improved device for collecting the excrements of pet animals, more particularly an improved device of the aforementioned automatic type.

SUMMARY OF THE INVENTION

To this aim, the invention relates to a device for collecting the excrements of pet animals, more particularly a so-called litter box for cats, of the type which at least consists of a receptacle in which a filling material can be provided, and a carrying element which can be moved through the receptacle in order to remove waste from the filling material, with the characteristic that the invention is equipped with removal means which can cooperate with the carrying element and remove waste substances from the carrying element.

By equipping the device according to the invention with such removal means, it is obtained that waste substances which possibly adhere to the carrying element and do not drop thereof by themselves, for example, because they stick to the carrying element or, in the case of a carrying element in the form of a comb, are stuck between the teeth thereof, are removed explicitely. Hereby, it is excluded that the waste substances, during the backward movement of the carrying element, end up in the receptacle again or permanently, remain at the carrying element and have to be removed manually.

Preferably, the removal means are designed as loosening means, more particularly, in the form of a scraper, with which waste substances which have adhered to the carrying element are removed from this carrying element.

In the case that the carrying element consists of a comb which is movable through the receptacle, the removal means preferably consist of elements which can be moved in the interspaces between the teeth of the comb and thereby push loose the waste and other substances situated in between them, more particularly, adhered to and/or stuck in between them. In the most preferred form of embodiment, these elements in their turn are also formed by the teeth of a comb.

In the most preferred form of embodiment, the aforementioned elements are rotatable, whereby they are rotated during their activation through the interspaces between the teeth of the carrying element. This is preferably performed in such a manner that they, during the pushing off, pass alongside the teeth of the carrying element in such a manner that they perform a movement towards the free extremities of the teeth as well as from the back to the front. As a consequence of this movement, substances stuck in between the teeth of the carrying element are pushed off therefrom in an optimum manner.

In the most preferred form of embodiment, the device comprises automatic operation means for activating the removal means at least each time when the carrying element is active. As a result thereof, it is guaranteed after each cleaning cycle that no substances remain at the carrying element.

Preferably, the carrying element as well as the removal means, more particularly the loosening comb, will be mounted on one and the same movable carriage. In such a case, it is also preferred that the removal means, more particularly loosening means, are situated such that they are activated directly or indirectly by the movement of the carriage, in such a manner that no separate drives, such as a special drive motor or similar, will have to be provided.

In a practical form of embodiment, use is made of an operation element which, when the carriage has come into a certain position, cooperates with a stop-forming part, whereby the removal means, more particularly the aforementioned loosening comb, are activated by the contact of the operation element with the stop-forming part.

Furthermore, the device, as known, preferably shall be equipped with a receiving container for the removed waste substances. In such a case, the removal means preferably are provided with operation means which are designed in such a manner that the removal means are activated at that moment when the carrying element is situated at the height of the receiving container. Hereby, it is obtained that not only the waste substances pushed off freely by the carrying element ahead thereof end up in the receiving container but also the waste substances which are loosened from the carrying element by the removal means.

According to a particular form of embodiment, the removal means are situated at the height of one of the extremities of the device and are installed in such a manner that they cooperate with the carrying element when this latter reaches the extremity concerned. The loosening movement then is obtained by the mutual movement between the moving carrying element and the removal means situated fixedly at one extremity of the receptacle.

Besides, the device preferably also comprises operation means which allow that the removal means, more particularly loosening means, at least can be controlled manually. In the case of a non-automatically operating device, the carrying element then can easily be freed of substances adhered thereto by operating the removal means manually now and then. In the case of a device which does work automatically, such manual operation means allow for an additional manual control of the removal means, if desired.

The invention also relates to an auxiliary element which can be mounted on an existing device for collecting excrements of pet animals, in order to transform it into a device according to the present invention. To this aim, this auxiliary element consists of a loosening element which can cooperate with the carrying element of such device and which is provided with mounting means, such as fixation flanges for installing it on the existing device.

BRIEF DESCRIPTION OF THE DRAWINGS

With the intention of better showing the characteristics of the invention, hereafter, as examples without any limitative character, several preferred forms of embodiment are described, with reference to the accompanying drawings, wherein:

FIGS. 6 and 7 schematically represent a portion of a variant, for two different positions;

FIG. 8 represents a portion of another variant of the invention;

FIG. 9 represents a cross-section according to line IX—IX in FIG. 8.

DETAILED DESCRIPTION

Figure 1:
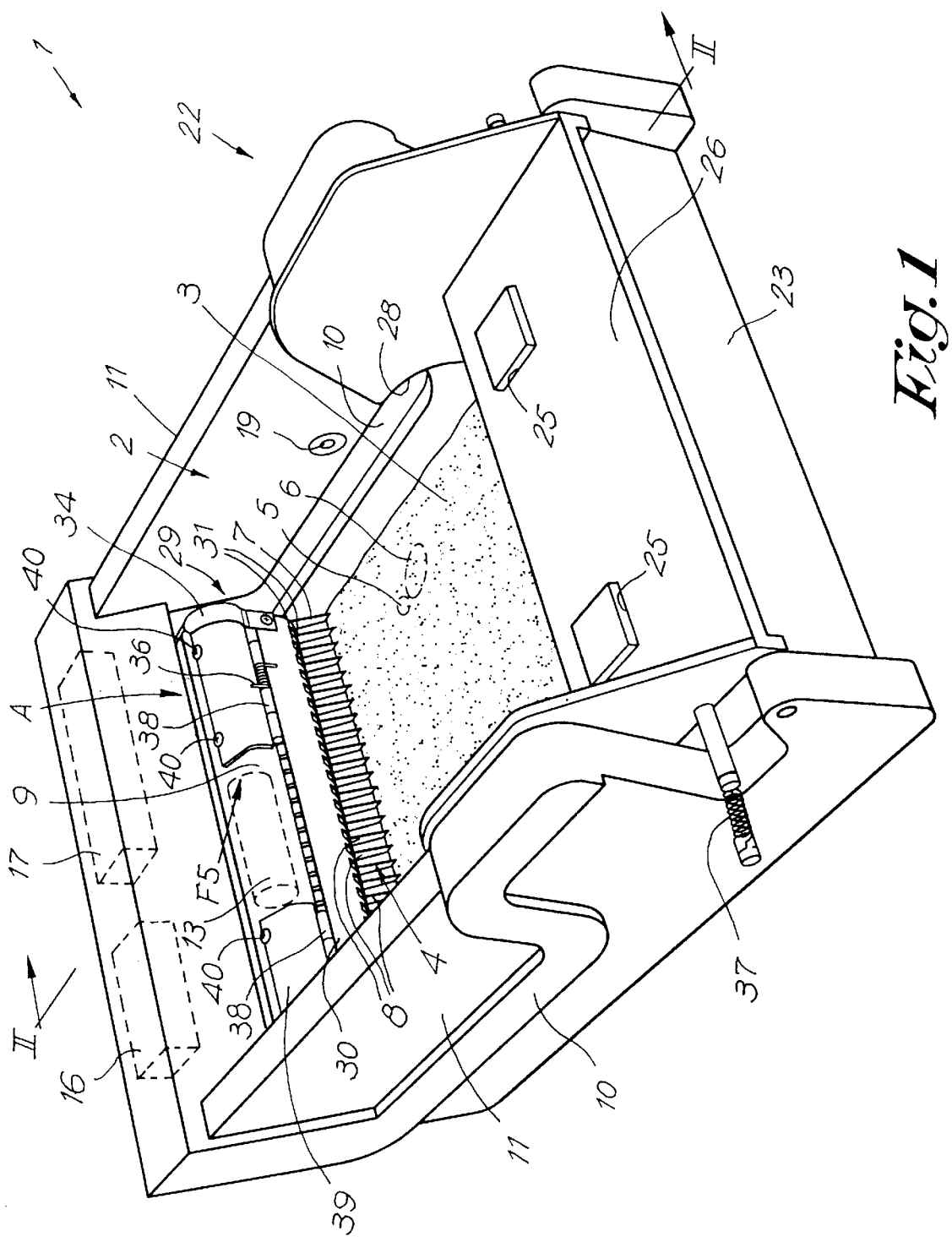
FIG. 1 in perspective represents a view according to the invention.

As represented in the FIGS. 1 to 4, the device 1 consists of a receptacle 2 in which a filling material 3 is provided, and a carrying element 4 which can be moved through the receptacle 2 in order to remove waste substances 5–6 therefrom.

The carrying element 4 substantially consists of a comb 7, extending over the width of the receptacle 2, with downward-directed teeth 8 and is fixed at a carriage or sledge 9 which can move to and fro alongside guidings 10 in the side walls 11 of the receptacle 2.

The guidings 10 have such a form that the comb 7 can move from a rest position A to a lowered position, whereby the comb 7 is drawn through the filling material 3 like a rake and subsequently is brought upward up to over the edge 12 of the receptacle 2, from the position C to the position D, respectively.

The drive of the carriage 9 is performed by means of a motor and gear wheels 14 driven thereby which engage in toothings 15 at the height of the guidings 10. The motor 13 is actuated by means of a control and supply unit 16 which is supplied by means of a battery 17 or a connection to the mains which is not represented. The electric coupling between the motor 13 and the control and supply unit 16 is performed, for example, by means of a cable 18 winding up automatically.

The motor 13 can be switched on automatically or manually. For the automatic switching-on, use is made of an optical sensor 19 which is coupled to the unit 16, in such a manner that the carriage 9 is moved to and fro automatically each time when a certain period of time has passed after the presence of an animal in the device has been detected. Limit stop switches 20 and 21 thereby control the end of the forward, backward respectively, movement of the carriage 9.

At the extremity 22 of the receptacle 2, a receiving container 23 is situated which is closed off by means of a cover lid 24. By means of a clamping coupling 25, the cover lid 24 is fixed at a swivellable element 26 which is provided with operation arms 27 with guiding edges 28 cooperating with the carriage 9, in such a manner that the element 26 and the cover lid 24 fixed thereon can be swivelled open by the approaching carriage 9.

The particularity of the present invention consists in that the device 1 is equipped with removal means 29 which can cooperate with the carrying element 4.

In the represented example, these removal means 29 consist of a second comb 30 with teeth 31 which can be moved between the teeth 8 of the first comb 7. To this aim, in the represented example the comb 30 is fixed at the carriage 9 and can be rotated around the indicated rotation axis 32.

The teeth 31 are bent. The convex sides 33 work as pushing-off side.

The removal means, in other words, the comb 30, are provided with an operation element in the form of a lever arm 34 which can cooperate with a stop-forming part 35, which in this case is formed by the underside of the aforementioned cover lid 24 and/or element 26.

The removal means, or in this case, thus, the comb 30, are also provided with reversing means forcing the comb 30 towards the rest position, which means in the represented example consist of one or more torsion springs 36 provided at the height of the rotation axis 32.

At the element 26, elastic means 37 in the form of springs are provided which force the element 26 downward until the closed position of the cover lid 24 is obtained.

Figure 2:
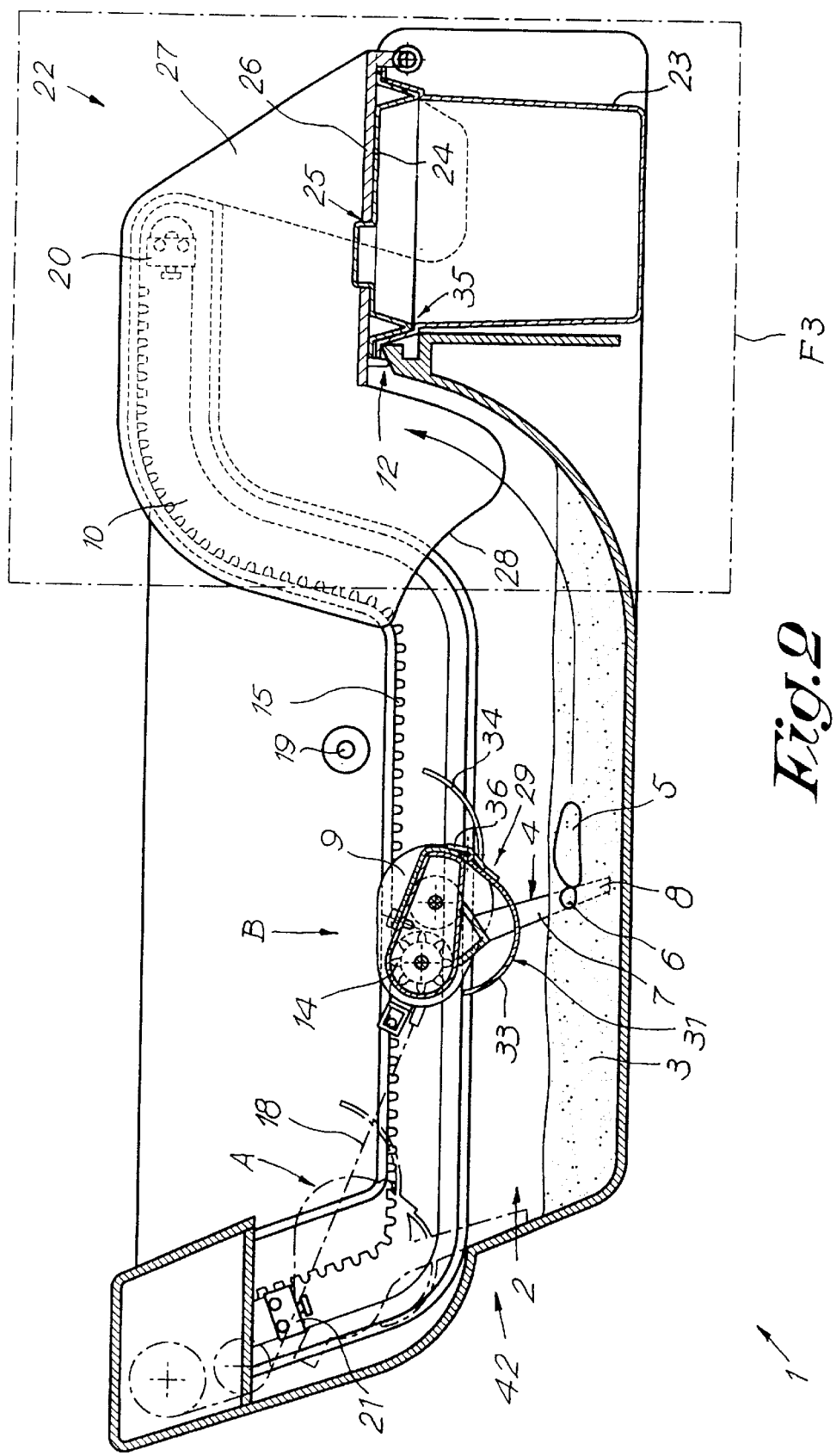
FIG. 2 represents a cross-section according to line II—II in FIG. 1, for another position.
Figure 3:
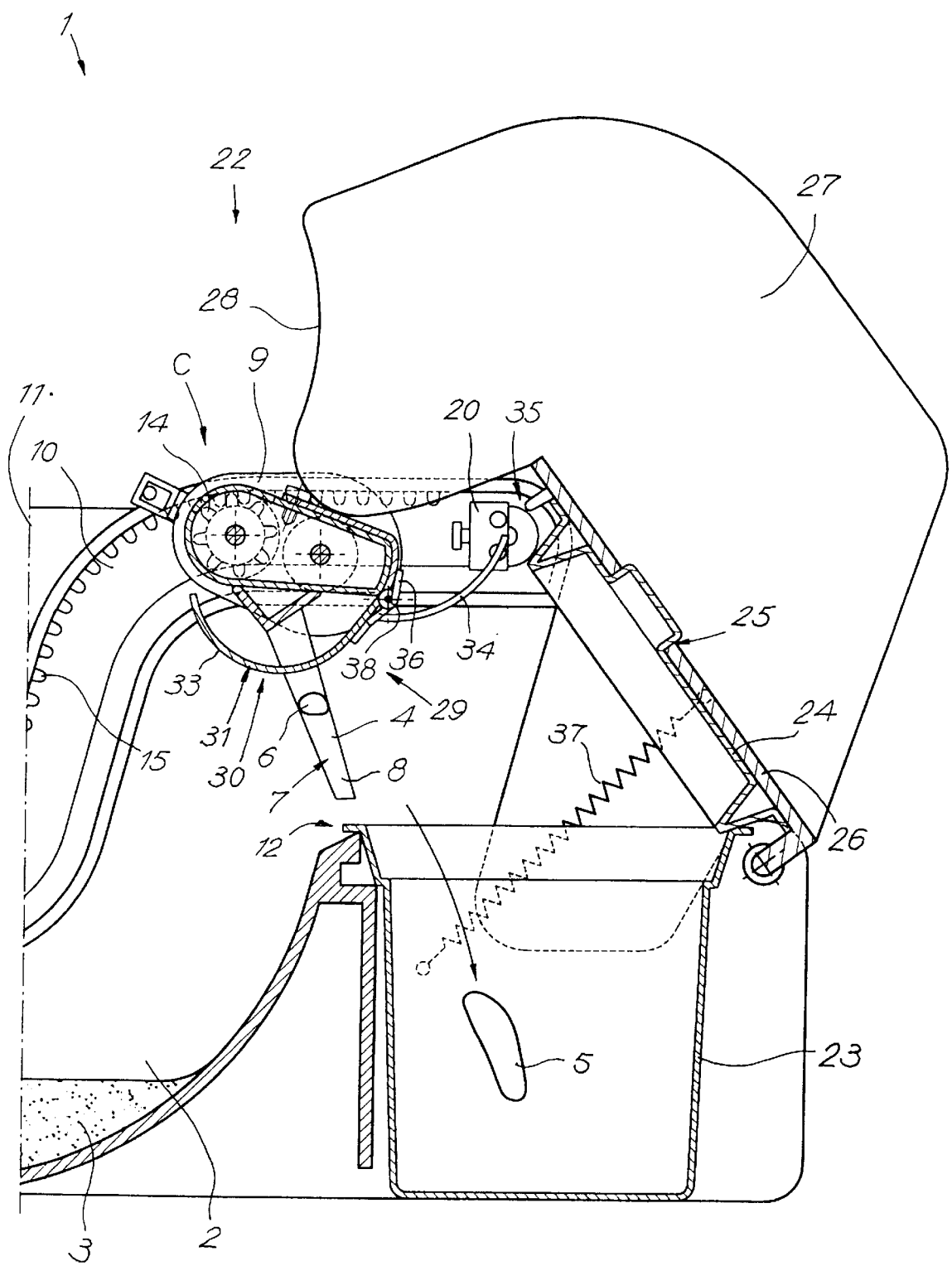
FIGS. 3 and 4 at a larger scale represent the portion indicated by F3 in FIG. 2, for another two different positions.
Figure 4:
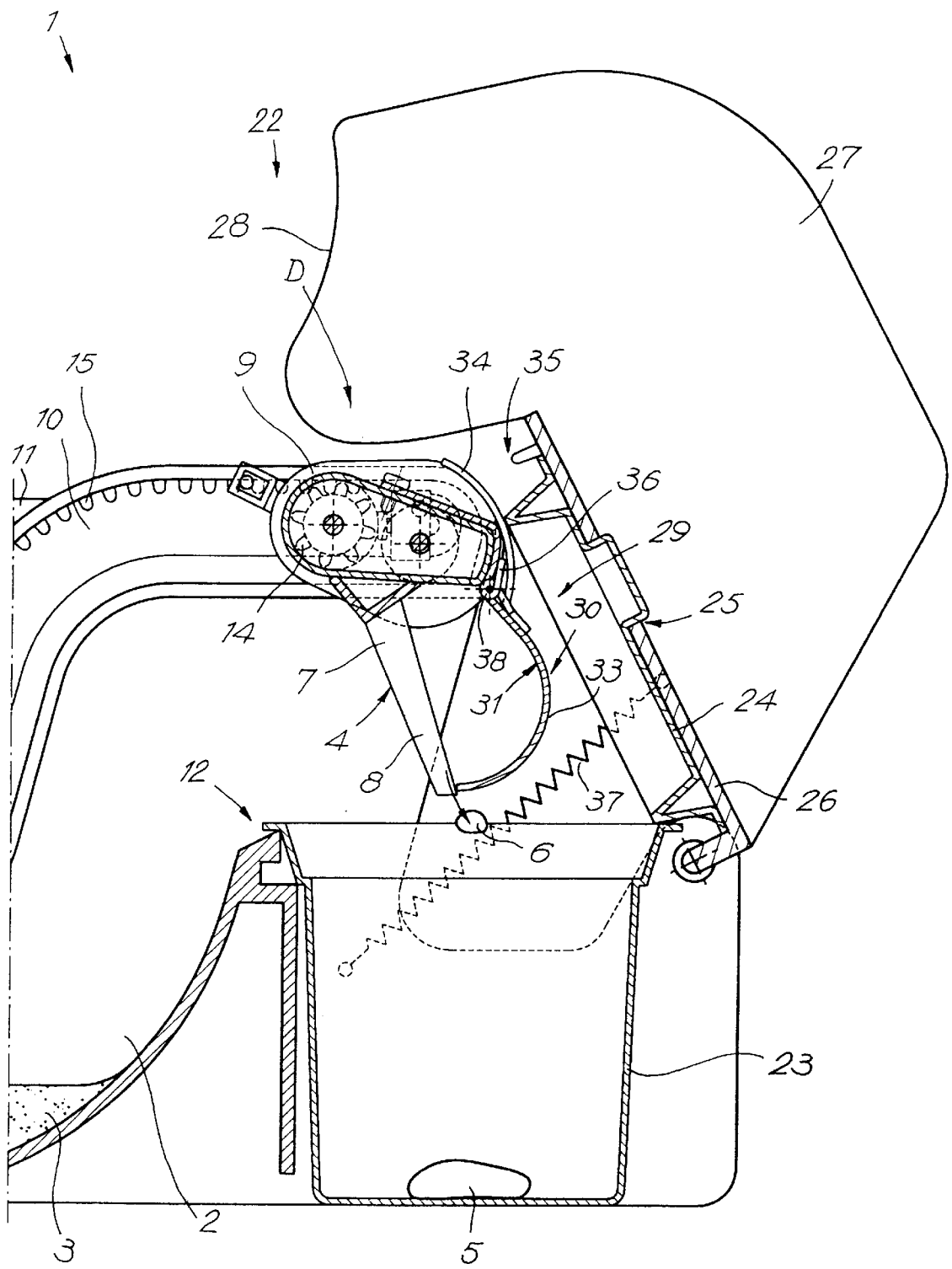
Figure 5:
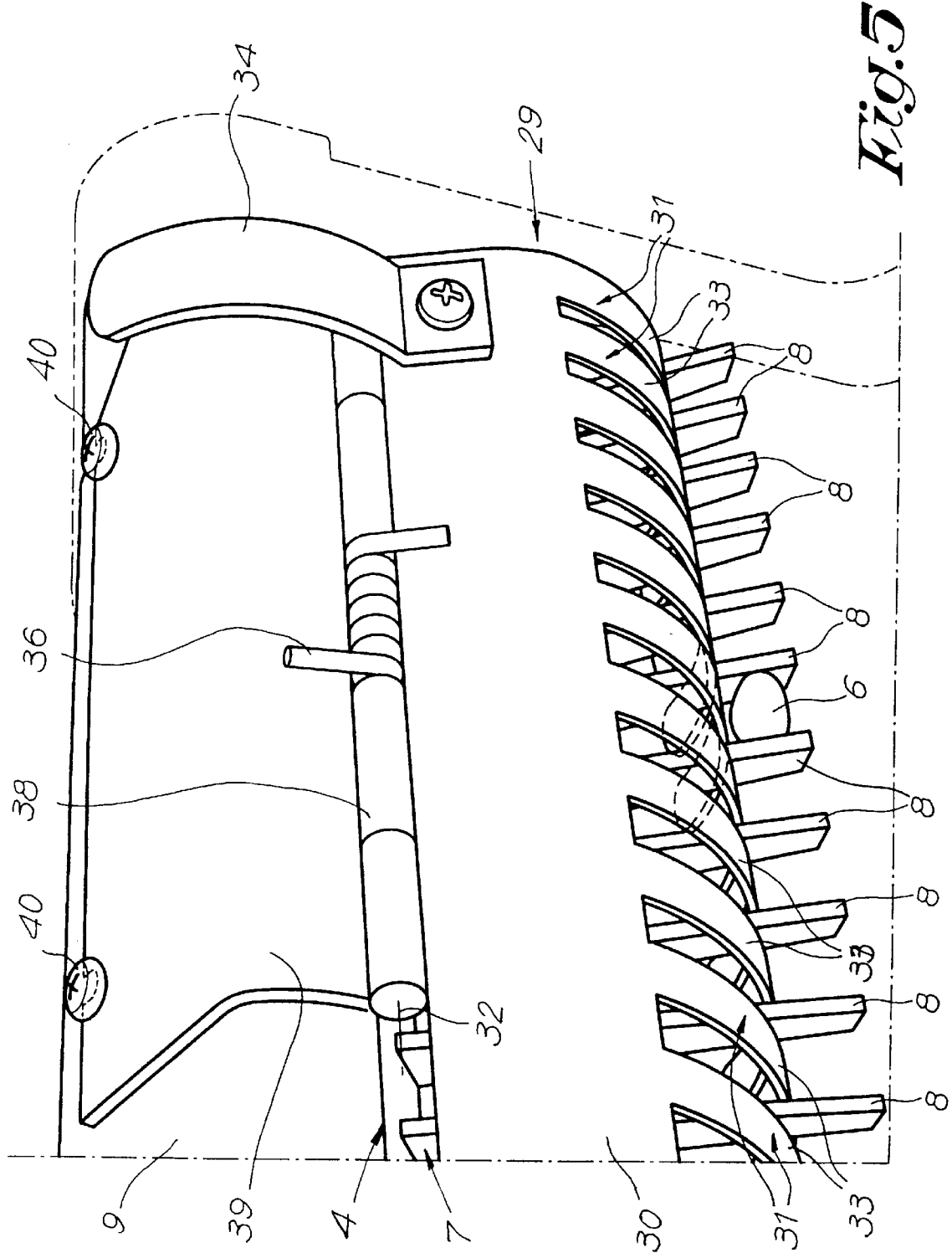
FIG. 5 at a larger scale represents a view according to arrow F5 in FIG. 1.

The working of the device 1, and more particularly of the carrying element 4 and the removal means 29 applied according to the invention, can be deduced from the FIGS. 2 to 4.

In rest position, the carrying element 4 is situated in position A of FIG. 2. After the animal concerned has used the device 1, which is detected by the optical sensor 19, the unit 16 provides for that the carriage 9 comes into motion. Hereby, this carriage 9 moves through the receptacle 2, whereby the teeth 8 of the comb 7 are pushed through the filling material 3, as indicated by position B in FIG. 2. Larger parts of waste substance 5 are pushed away in front of the teeth 8, but it may happen that smaller parts of waste substance 6 become stuck between the teeth 8.

During the further movement, the carriage 9 comes into contact with the edges 28 of the arms 27, as a result of which the element 26 together with the cover lid 24 fixed thereon is swivelled open.

When the carriage 9 has come into the position C of FIG. 3, the waste substance 5 is dropped over the edge 12 into the receiving container 23.

During the further movement of the carriage 9, the lever 34 comes into contact with the underside of the cover lid 24, as a result of which this lever 34 is pushed in against the force of the springs 36, with the consequence that the comb 30, as indicated by arrow R in FIG. 4, is rotated and stuck parts of waste substance 6 are pushed off from in between the teeth 8 by means of the teeth 31, as a result of which also these parts of waste substance 6 end up in the receiving container 23.

By means of the placement of the combs 7 and 30 represented in the figures, it is obtained that the teeth 31 during their rotation pass alongside the teeth 8 in such a manner that they perform a movement towards the free extremities of the teeth 8, as well as from the rear to the front, as a result of which an efficient loosening movement is realized.

Because the teeth 31 push with their convex side against the part of waste substance 6, the contact surface generally is small and the risk is small that this part of waste substance 6 in its turn adheres to the teeth 31.

The springs 37 provide for that a sufficiently large reversing force is exerted upon the element 26 and the cover lid 24 fixed thereon, in order to obtain that the lever 34 is swivelled.

The limit stop switch 20 provides for the reversion of the movement of the carriage 9.

During the backward movement of the carriage 9, the comb 30, under the influence of the force exerted by the springs 36, is swivelled back into its initial position and the cover lid 24 swivels back downward, as a result of which the spreading of odor from the receiving container 23 is prevented.

Finally, the carriage 9 is stopped again in the rest position A by means of the limit stop switch 21.

In order to empty the receiving container 23, it can be taken off with closed cover lid 24 in a known manner, by pushing off this cover lid 24 at the height of the clamping coupling 25 from the element 26, swivelling the element 26 completely upward and lifting the closed receiving container 23 out of the device 1.

It is noted that the comb 30 can be fixed by means of hinges which are attached fixedly at the carriage 9, with which it is meant that these hinges are attached at the carriage 9 in such a manner that they cannot be dismounted in a simple manner. Preferably, however, as represented in the figures, use is made of an easily dismountable comb 30 which, by means of hinges 38, is coupled to fixation flanges 39 wich can easily be attached on the carriage 9 by means of screws 40, or in any other manner, for example, by means of a snap-on connection.

Such dismountable construction allows to remove the comb 30 in a simple manner, for example, in order to clean the device 1, and more particularly the combs 7 and 30. This dismountable construction also allows to commercialize the comb 30 as a separate accessory which can be mounted on the existing or new devices, if desired.

It is clear that different variants are possible. So, for example, do the removal means not necessarily have to be mounted on the carriage 9. FIGS. 6 and 7, for example, represent a variant wherein the comb 30 is fixed at the underside of the element 26 or another constructional part of the extremity 22 of the device 1. During the approach of the comb 7, the teeth 31 engage between the teeth 8, according to the position from FIG. 6. During the further movement of the comb 7, this latter pushes against the comb 30 or a stop 41 cooperating therewith, with as a result that the teeth 31 perform a push-off movement between the teeth 8, analogous to the movement which is represented in FIG. 4.

Although it is preferred that the removal means, or, thus, the comb 30, are activated at the moment when the carrying element 4 is situated above the receiving container 23, this is no strict necessity.

In FIGS. 8 and 9, a variant is represented whereby the removal means 29 are attached at that extremity 42 of the receptacle 2 which is situated opposite to the extremity 22. Hereby, the removal means 29 consist of a series of protrusions 43 on the wall of the receptacle 2 which are situated such that they penetrate between the teeth 8 of the carrying element 4, at the moment when this latter moves back into the rest position A, this such as indicated in FIG. 9. Thereby, stuck waste substances 6 are pushed loose but, however, remain in or upon the filling material 3 until a subsequent cleaning cycle is performed by the carrying element 4. The risk of the waste substances 6 of getting stuck again between the teeth 8, then, is small.

It is noted that the removal means not necessarily have to consist of the teeth of a comb but also other elements can be applied which can penetrate between the teeth 8 of the carrying element 4. Depending on the construction, it is also so that other removal means than elements penetrating between the teeth 8 can be applied, such as, for example, one or more doctor blades extending over the width which are moved up and down along the front side, rear side respectively, of the teeth 8.

The carrying element 4 also does not necessarily have to be an element which is placed on a carriage 9.

Instead of the aforementioned elastic means 37, use may also be made of means forming a fixed stop for the element 26, in such a manner that in FIG. 3, the end position of this element is determined unambiguously. In a practical form of embodiment, this can be realized by replacing the springs 37 by a connection with a fixed maximum length, such as a rope, chain or similar. Use may also be made of a fixed stop which forms part of the side wall 11 of the receptacle or similar which limits the rotation of the element 26 or of the arms 27.

The present invention is in no way limited to the forms of embodiment described as an example and represented in the figures, however, such device and auxiliary element can be realized according to various variants without leaving the scope of the invention.

What is claimed is:

1. A device for collecting excrements of pet animals comprising a receptacle for receiving a filling material, a carrying element arranged to be moved through the receptacle to remove waste substances from filling material placed in the receptacle, and a removal that cooperates with the carrying element to remove waste substances from the carrying element.

2. The device according to claim 1, wherein the carrying element comprises a first comb having a first set of teeth wherein the removing unit is arranged to penetrate between said first set of teeth.

3. The device according to claim 2, wherein the removal unit comprises a second comb having a second set of teeth.

4. The device according to claim 2, wherein the removal unit is rotatable and swivelled between the first set of teeth so that said removal unit passes through the first set of teeth by rotatable pivoting outward to remove the waste substances.

5. The device according to claim 3, wherein the second set of teeth are bent so as to present convex sides, wherein the convex sides push off waste substances they encounter.

6. The device according to claim 1, wherein the removal unit is activated automatically when the carrying element is activated.

7. The device according to claim 1, wherein the carrying element is provided on a movable carriage and wherein the removal unit is also mounted on the carriage so as to move with the carrying unit through the receptacle.

8. The device according to claim 1, wherein the carrying element is mounted on a movable carriage and the removal unit is activated in response to movement of the carriage.

9. The device according to claim 1, wherein the carrying element is provided on a movable carriage and wherein the removal unit is mounted on the carriage in a movable manner and is provided with an operation element which cooperates with a stop-forming part when the carriage has arrived at a predetermined position, and wherein the removal unit is activated by the contact of the operation element with the stop-forming part.

10. The device according to claim 9, wherein the removal unit comprises a rotatable comb with a second set of teeth which move between a first set of teeth of the carrying element and wherein the operation element comprises a lever arm that rotates the rotatable comb.

11. The device according to claim 1, wherein the removal unit is provided with a reversing means which forces the removal unit into a rest position.

12. The device according to claim 1 comprising a receiving container for said waste substances arranged in such a manner that said removal unit is activated at that moment when the carrying element is situated at the height of the receiving container.

13. The device according to claim 12, wherein the receiving container is provided with a cover lid which is arranged to be pushed open by the carrying element the cover lid defining a stop by which the removal unit may be activated.

14. The device according to claim 1, wherein the removal unit is arranged on a wall at an extremity of the receptacle, so that when the carrying element is at the extremity, the removal unit cooperates with the carrying element to loosen the waste substances.

15. The device according to claim 1, wherein the removal unit is manually operable.

16. An auxiliary element for loosening waste substances from a device for collecting excrements of pet animals, said auxiliary element comprising a loosening element that cooperates with a carrying element of said device and a means for mounting the auxiliary element onto said device.

17. The auxiliary element according to claim 16, wherein said mounting means comprises at least one fixation flange, the fixation flange being mountable onto a movable carriage of said device, and said loosening means comprises a rotatable comb carried by said fixation flange to cooperate with said carrying element.

* * * * *